(12) United States Patent
Khoryaev et al.

(10) Patent No.: US 11,792,619 B2
(45) Date of Patent: Oct. 17, 2023

(54) SIDELINK COMMUNICATION UNDER CONTROL OF LTE UU INTERFACE OR NR INTERFACE

(71) Applicant: Apple Inc., Cupertino, CA (US)

(72) Inventors: Alexey Khoryaev, Nizhny Novgorod (RU); Andrey Chervyakov, Nizhny Novgorod (RU); Mikhail Shilov, Nizhny Novgorod (RU); Sergey Panteleev, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 326 days.

(21) Appl. No.: 17/258,903

(22) PCT Filed: Aug. 8, 2019

(86) PCT No.: PCT/US2019/045785
§ 371 (c)(1),
(2) Date: Jan. 8, 2021

(87) PCT Pub. No.: WO2020/033751
PCT Pub. Date: Feb. 13, 2020

(65) Prior Publication Data
US 2021/0321234 A1 Oct. 14, 2021

Related U.S. Application Data

(60) Provisional application No. 62/717,316, filed on Aug. 10, 2018.

(51) Int. Cl.
*H04W 4/40* (2018.01)
*H04W 24/10* (2009.01)
(Continued)

(52) U.S. Cl.
CPC ............. *H04W 4/40* (2018.02); *H04W 24/10* (2013.01); *H04W 56/001* (2013.01); *H04W 72/23* (2023.01); *H04W 92/18* (2013.01)

(58) Field of Classification Search
CPC ..... H04W 4/40; H04W 24/10; H04W 56/001; H04W 72/23; H04W 92/18; H04W 4/02;
(Continued)

(56) References Cited

U.S. PATENT DOCUMENTS

2018/0098323 A1 4/2018 Zhang et al.
2021/0266994 A1* 8/2021 Li .................. H04W 24/10
(Continued)

FOREIGN PATENT DOCUMENTS

WO 2017105534 6/2017
WO 2018044358 3/2018

OTHER PUBLICATIONS

Digital cellular telecommunications system (Phase 2+) (GSM); Universal Mobile Telecommunications System (UMTS); LTE; 5G; Release description; Release 14, ETSI TR 121914 V14.0.0,Jun. 28, 2018, pp. 1-104.
(Continued)

*Primary Examiner* — Kyaw Z Soe
(74) *Attorney, Agent, or Firm* — Kowert, Hood, Munyon, Rankin & Goetzel, P.C.

(57) ABSTRACT

Embodiments of a User Equipment (UE), Next Generation Node-B (gNB), Evolved Node-B (eNB) and methods of communication are generally described herein. The UE may detect one or more LTE synchronization signals from an eNB over an LTE Uu interface between the UE and the eNB. The LTE synchronization signals may be detected in resources allocated for LTE communication. The LTE synchronization signals may be detected in accordance with an LTE protocol. The UE may determine, based on the LTE synchronization signals, a reference timing and a reference frequency for NR vehicle-to-everything (V2X) communication over an NR PC5 interface with another UE.

20 Claims, 4 Drawing Sheets

(51) Int. Cl.
  *H04W 56/00* (2009.01)
  *H04W 72/23* (2023.01)
  *H04W 92/18* (2009.01)

(58) Field of Classification Search
  CPC ... H04W 4/00; H04W 88/04; H04W 56/0015; H04W 56/002; H04W 84/047; H04J 11/0079
  See application file for complete search history.

(56) References Cited

U.S. PATENT DOCUMENTS

2022/0174655 A1* 6/2022 Tsai ................ H04W 4/40
2022/0248425 A1* 8/2022 Lee ................ H04W 72/1263

OTHER PUBLICATIONS

3GPP TSG SA; "Study on security aspects for LTE support of Vehicle-to-Everything (V2X) services (Release 14)" 3GPP TR 33.885 V14.1.0; Sep. 21, 2017; pp. 1-75.
International Search Report and Written Opinion of International Application No. PCT/US2019/045785, dated Nov. 21, 2019, pp. 1-13.

* cited by examiner

SIDELINK COMMUNICATION UNDER CONTROL OF LTE UU INTERFACE OR NR INTERFACE

PRIORITY CLAIM

This application claims priority to U.S. Provisional Patent Application Ser. No. 62/717,316, filed Aug. 10, 2018, which is incorporated herein by reference in its entirety.

TECHNICAL FIELD

Embodiments pertain to wireless communications. Some embodiments relate to wireless networks including 3GPP (Third Generation Partnership Project) networks, and 3GPP LTE (Long Term Evolution) networks, Fifth Generation (5G) networks, and/or New Radio (NR) networks. Some embodiments relate to sidelink communication, vehicle-to-vehicle (V2V) communication and/or vehicle-to-everything (V2X) communication. Some embodiments relate to methods of sidelink communication and sidelink synchronization over an LTE Uu interface or an NR Uu interface.

BACKGROUND

Efficient use of the resources of a wireless network is important to provide bandwidth and acceptable response times to the users of the wireless network. However, often there are many devices trying to share the same resources and some devices may be limited by the communication protocol they use or by their hardware bandwidth. Moreover, wireless devices may need to operate with both newer protocols and with legacy device protocols.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
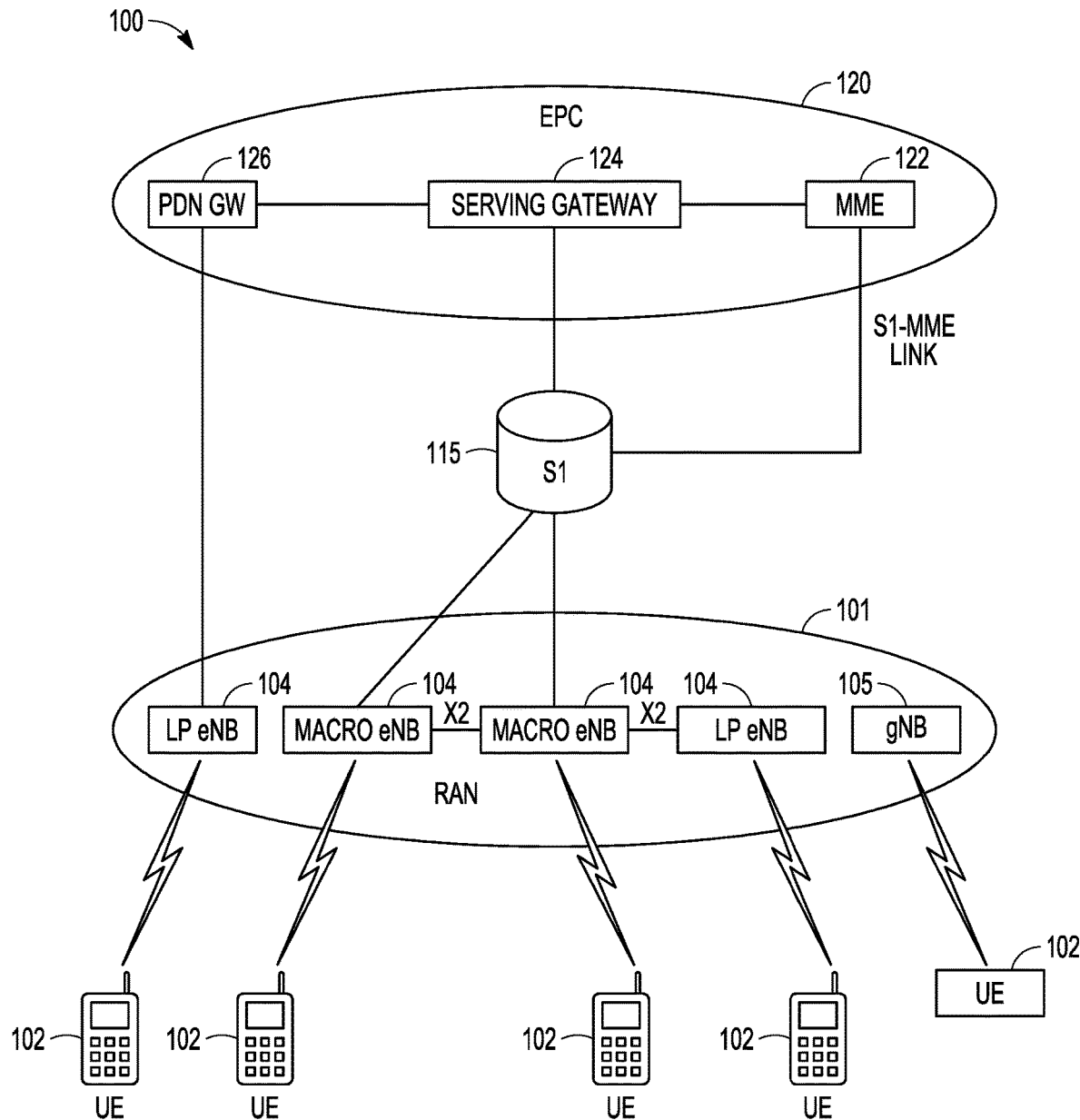
FIG. 1A is a functional diagram of an example network in accordance with some embodiments.
Figure 1B:
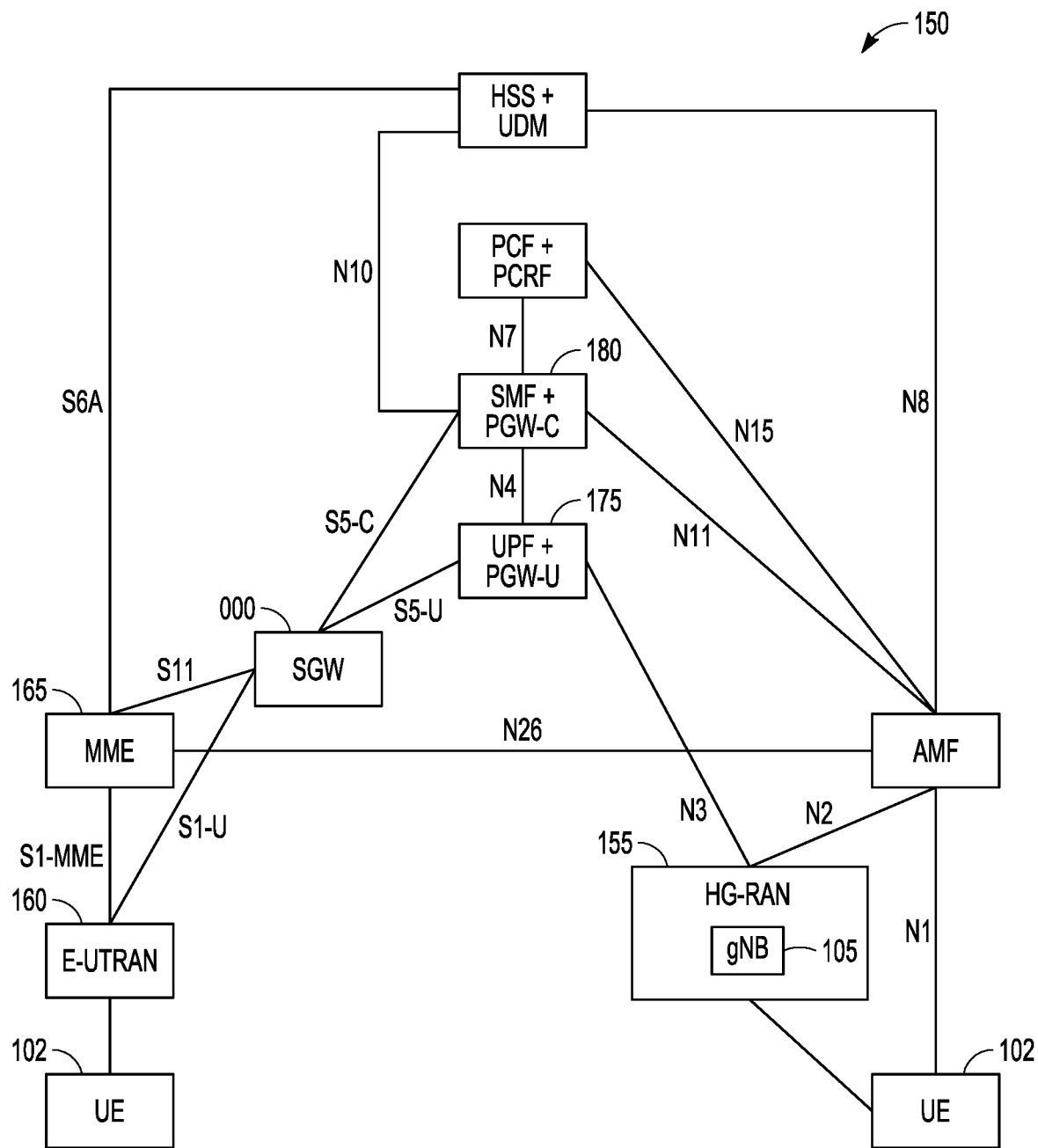
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network, a new radio (NR) network and/or Fifth Generation (5G) network. Other networks may be used in some embodiments. In some embodiments, a network may include one or more of: one or more components shown in FIG. 1A; one or more components shown in FIG. 1B; and one or more additional components. Some embodiments may not necessarily include all components shown in FIG. 1A and FIG. 1B.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In some embodiments, the RAN 101 may include one or more of: one or more components of an evolved universal terrestrial radio access network (E-UTRAN), one or more components of an NR network, and/or one or more other components.

The core network 120 may include a mobility management entity (MME) 122, a serving gateway (serving GW) 124, and packet data network gateway (PDN GW) 126. In some embodiments, the networks 100, 150 may include (and/or support) one or more Evolved Node-B's (eNBs) 104 and/or one or more Next Generation Node-B's (gNBs) 105. The eNBs 104 and/or gNBs 105 may operate as base stations for communicating with User Equipment (UE) 102. In some embodiments, one or more eNBs 104 may be configured to operate as gNBs 105. Embodiments are not limited to the number of eNBs 104 shown in FIG. 1A or to the number of gNBs 105 shown in FIG. 1B. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with one or more of: a 3GPP LTE protocol/standard, an NR protocol/standard, a Fifth Generation (5G) protocol/standard; and/or other protocol/standard, although the scope of embodiments is not limited in this respect.

Descriptions herein of one or more operations, techniques and/or methods practiced by a component (such as the UE 102, eNB 104, gNB 105 and/or other) are not limiting. In some embodiments, one or more of those operations, techniques and/or methods may be practiced by another component.

The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. The serving GW 124 and the MME 122 may be implemented in one physical node or separate physical nodes.

In some embodiments, UEs 102, the eNB 104 and/or gNB 105 may be configured to communicate Orthogonal Frequency Division Multiplexing (OFDM) communication signals over a multicarrier communication channel in accordance with an Orthogonal Frequency Division Multiple Access (OFDMA) communication technique.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165, which may be similar to the MME 122 described herein, although the scope of embodiments is not limited in this respect. In some embodiments, the network 150 may include the SGW 170, which may be similar to the SGW 124 described herein, although the scope of embodiments is not limited in this respect.

Embodiments are not limited to the number or type of components shown in FIG. 1B. Embodiments are also not limited to the connectivity of components shown in FIG. 1B.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
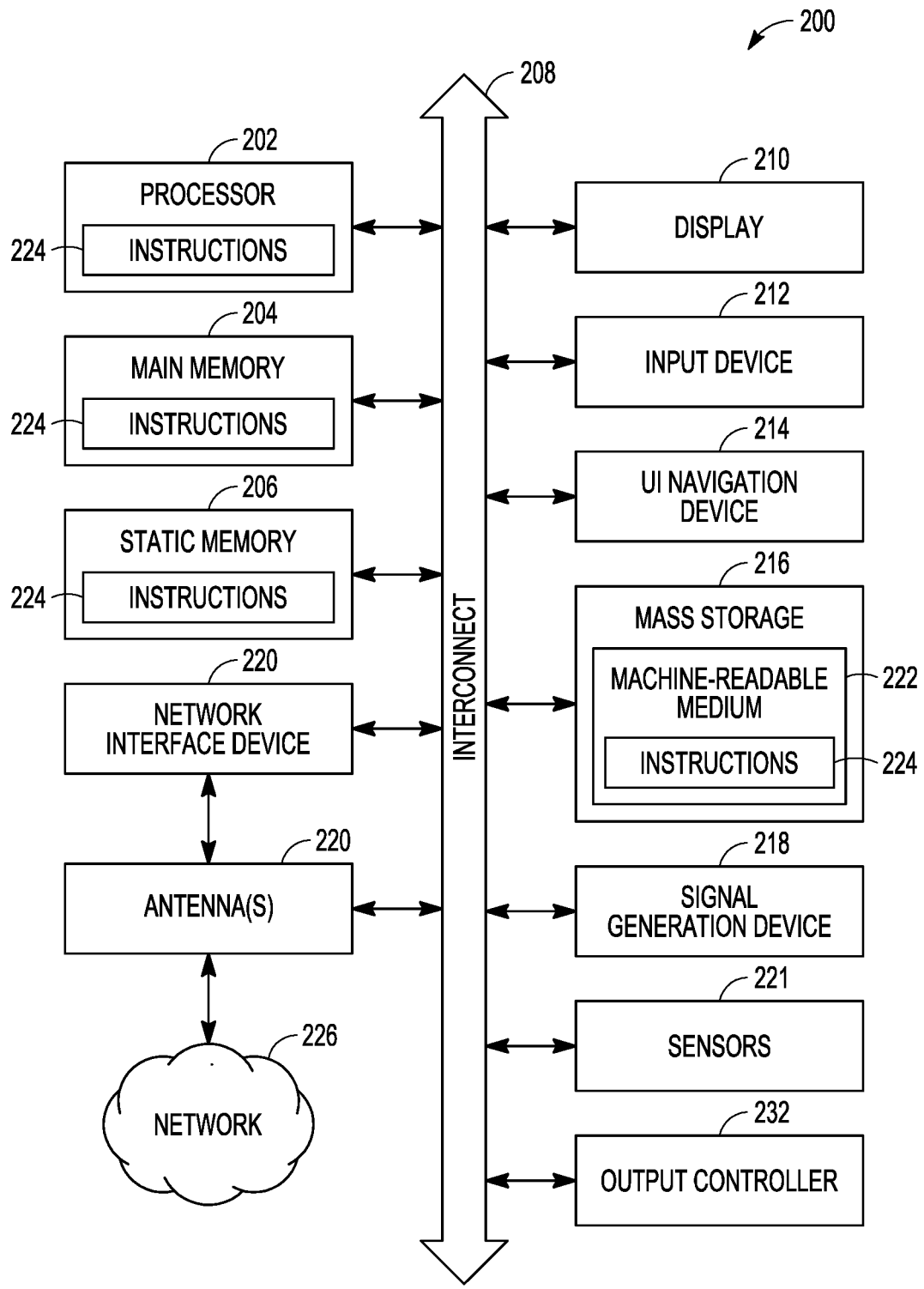
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. The machine 200 may be a UE 102, eNB 104, gNB 105, access point (AP), station (STA), user, device, mobile device, base station, another device, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include one or more of 210-228.

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
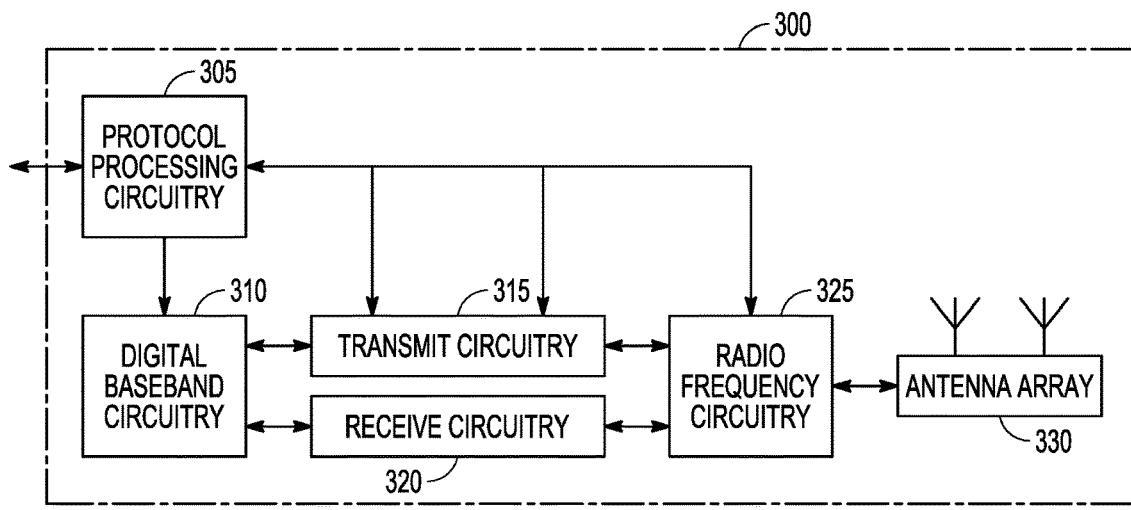
FIG. 3 illustrates an exemplary communication circuitry according to some aspects.

FIG. 3 illustrates an exemplary communication circuitry according to some aspects. It should be noted that a device, such as a UE 102, eNB 104, gNB 105, the machine 200 and/or other device may include one or more components of the communication circuitry 300, in some aspects. The communication circuitry 300 may include protocol processing circuitry 305, which may implement one or more of: medium access control (MAC), radio link control (RLC), packet data convergence protocol (PDCP), radio resource control (RRC) and non-access stratum (NAS) functions. The communication circuitry 300 may further include digital baseband circuitry 310, which may implement one or more physical layer (PHY) functions. The communication circuitry 300 may further include transmit circuitry 315, receive circuitry 320 and/or antenna array circuitry 330. The communication circuitry 300 may further include radio frequency (RF) circuitry 325. In an aspect of the disclosure, RF circuitry 325 may include multiple parallel RF chains for one or more of transmit or receive functions, each connected to one or more antennas of the antenna array 330.

In some embodiments, processing circuitry may perform one or more operations described herein and/or other operation(s). In a non-limiting example, the processing circuitry may include one or more components such as the processor 202, protocol processing circuitry 305, digital baseband circuitry 310, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as transmit circuitry 315, receive circuitry 320, radio frequency circuitry 325, similar component(s) and/or other component(s).

Although the UE 102, eNB 104, gNB 105, machine 200 and/or other device described herein may each be illustrated as having several separate functional elements, one or more of the functional elements may be combined and may be implemented by combinations of software-configured elements, such as processing elements including digital signal processors (DSPs), one or more microprocessors, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, machine 200, and/or other device may include various components shown in FIGS. 2-3 and/or other components. Accordingly, techniques and operations described herein that are performed by a device may be performed by an apparatus of the device, in some embodiments.

In accordance with some embodiments, the UE 102 may detect one or more LTE synchronization signals from an eNB 104 over an LTE Uu interface between the UE 102 and the eNB 104. The LTE synchronization signals may be detected in resources allocated for LTE communication. The LTE synchronization signals may be detected in accordance with an LTE protocol. The UE 102 may determine, based on the LTE synchronization signals, a reference timing and a reference frequency for NR vehicle-to-everything (V2X) communication over an NR PC5 interface with another UE 102. The UE 102 may transmit a physical sidelink control (PSCCH) and a physical sidelink shared channel (PSSCH) in accordance with an NR protocol. The PSCCH and the PSSCH may be transmitted to the other UE 102 over the NR PC5 interface in resources allocated for NR V2X communication. These embodiments are described in more detail below.

Figure 4:
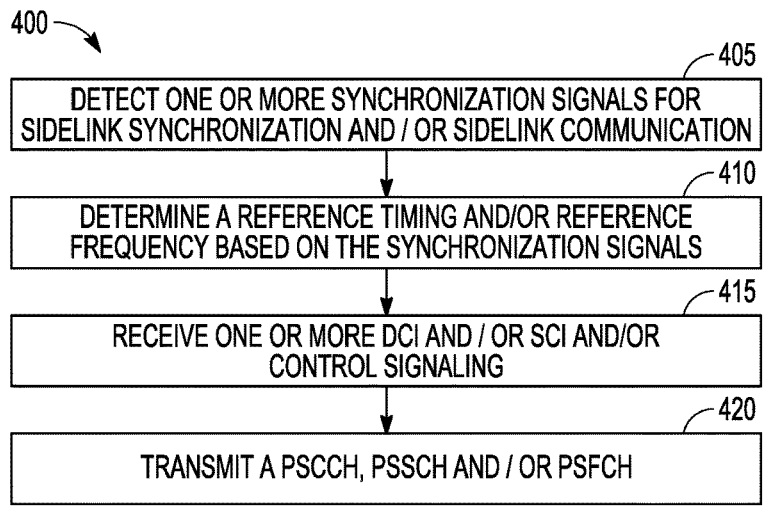
FIG. 4 illustrates the operation of a method of communication in accordance with some embodiments.
Figure 5:
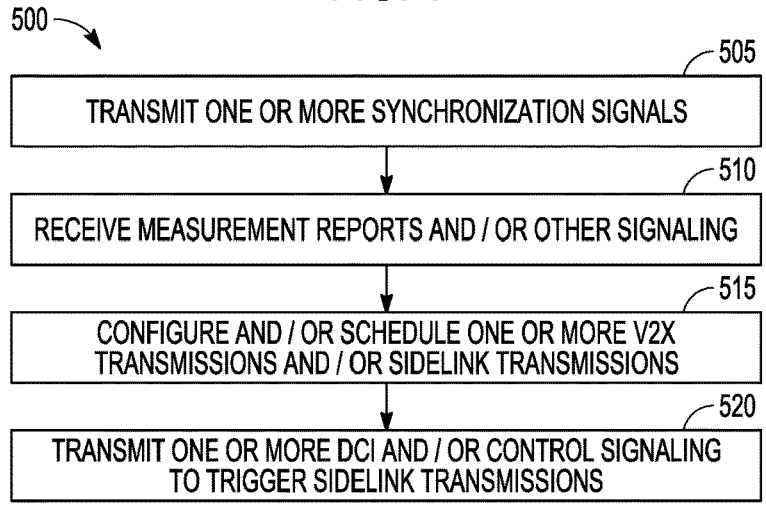
FIG. 5 illustrates the operation of another method of communication in accordance with some embodiments.

FIG. 4 illustrates the operation of a method of communication in accordance with some embodiments. FIG. 5 illustrates the operation of another method of communication in accordance with some embodiments. Embodiments of the methods 400, 500 may include additional or even fewer operations or processes in comparison to what is illustrated in FIGS. 4-5. Embodiments of the methods 400, 500 are not necessarily limited to the chronological order that is shown in FIGS. 4-5.

In some embodiments, a UE 102 may perform one or more operations of the method 400, but embodiments are not limited to performance of the method 400 and/or operations of it by the UE 102. In some embodiments, a device and/or component (including but not limited to the UE 102, gNB 105 and/or eNB 104) may perform one or more operations that may be the same as, similar to, reciprocal to and/or related to an operation of the method 400. In some embodiments, an eNB 104 or gNB 105 may perform one or more operations of the method 500, but embodiments are not limited to performance of the method 500 and/or operations of it by the eNB 104 or gNB 105. In some embodiments, a device and/or component (including but not limited to the UE 102, gNB 105 and/or eNB 104) may perform one or more operations that may be the same as, similar to, reciprocal to and/or related to an operation of the method 500.

Discussion of various operations, techniques and/or concepts regarding one method described herein (such as one of the methods 400, 500 and/or other) may be applicable to another method described herein (such as one of the methods 400, 500 and/or other). One or more of the techniques, operations and/or methods described herein may be performed by a device other than an eNB 104, gNB 105, and UE 102, including but not limited to a Wi-Fi access point (AP), station (STA) and/or other.

In some embodiments, an apparatus of a device (including but not limited to the UE 102, eNB 104, gNB 105 and/or other) may comprise memory that is configurable to store one or more elements, and the apparatus may use them for performance of one or more operations. The apparatus may include processing circuitry, which may perform one or more operations (including but not limited to operation(s) of the methods 400, 500 and/or other methods described herein). The processing circuitry may include a baseband processor. The baseband circuitry and/or the processing circuitry may perform one or more operations described herein. The apparatus may include a transceiver to transmit and/or receive one or more blocks, messages and/or other elements.

Embodiments are not limited by references herein to transmission, reception and/or exchanging of elements such as frames, messages, requests, indicators, signals or other elements. In some embodiments, such an element may be generated, encoded or otherwise processed by processing circuitry for transmission by a transceiver or other component cases. In some embodiments, such an element may be received by a transceiver or other component, and may be decoded, detected or otherwise processed by processing circuitry. In some embodiments, the processing circuitry and the transceiver may be included in a same apparatus. In some embodiments, the transceiver may be separate from the apparatus that comprises the processing circuitry, in some embodiments.

One or more of the elements (such as messages, operations and/or other) described herein may be included in a 3GPP protocol, 3GPP LTE protocol, 4G protocol, 5G protocol, NR protocol and/or other protocol, but embodiments are not limited to usage of those elements. In some embodiments, other elements may be used, including other element(s) in a same standard/protocol, other element(s) in another standard/protocol and/or other. In addition, the scope of embodiments is not limited to usage of elements that are included in standards.

In some embodiments, the UE 102, eNB 104 and/or gNB 105 may be arranged to operate in accordance with a 3GPP protocol, NR protocol, and/or other protocol.

At operation 405, the UE 102 may detect one or more synchronization signals for sidelink synchronization and/or sidelink communication. At operation 410, the UE 102 may determine a reference timing and/or a reference frequency based on the synchronization signals. At operation 415, the UE 102 may receive one or more downlink control information (DCI) and/or sidelink control information (SCI) and/or control signaling. At operation 420, the UE 102 may transmit a physical sidelink control (PSCCH), a physical sidelink shared channel (PSSCH) and/or a PSFCH.

In some embodiments, the UE 102 may detect one or more LTE synchronization signals from an eNB 104 over an LTE Uu interface between the UE 102 and the eNB 104. The LTE synchronization signals may be detected in resources allocated for LTE communication. The LTE synchronization signals may be detected in accordance with an LTE protocol. The UE 102 may determine, based on the LTE synchronization signals, a reference timing and/or a reference frequency for NR vehicle-to-everything (V2X) communication over an NR PC5 interface with another UE 102. The UE 102 may transmit a physical sidelink control (PSCCH) and a physical sidelink shared channel (PSSCH) in accordance with an NR protocol. The PSCCH and the PSSCH may be transmitted to the other UE 102 over the NR PC5 interface in resources allocated for NR V2X communication.

In some embodiments, the LTE synchronization signals may include one or more of: a primary synchronization signal (PSS), a secondary synchronization signal (SSS), and a physical broadcast channel (PBCH). In some embodiments, the LTE synchronization signals may include a cell-specific reference signal (CRS) or other reference signals.

In some embodiments, the UE 102 may detect the LTE synchronization signals and determine the reference timing and/or a reference frequency based on the LTE synchronization signals if: the UE 102 is configured for communication with the eNB 104 over the LTE Uu interface and the UE 102 is configured for communication with another UE 102 over an LTE PC5 interface (for instance, the UE 102 may be configured for LTE Uu and LTE PC5); or the UE 102 is configured for communication with the eNB 104 over the LTE Uu interface and the UE 102 is not configured for communication with another UE 102 over an LTE PC5 interface (for instance, the UE 102 may be configured for LTE Uu only); or the UE 102 is configured for communication with the eNB 104 over the LTE Uu interface and the UE 102 is configured for communication with another UE 102 over an NR PC5 interface.

In some embodiments, if the UE 102 is not configured for LTE communication over an LTE Uu interface, and the UE 102 is configured for NR communication over an NR Uu interface, the UE 102 may perform one or more of: detect one or more NR synchronization signals; determine, based on the NR synchronization signals, the reference timing and the reference frequency for the NR V2X communication over the NR PC5 interface with the other UE 102; and/or other. In some embodiments, the NR synchronization signals may be received from a gNB 105 that supports transmission of both LTE synchronization signals and NR synchronization signals or LTE synchronization signals received from an eNB 104.

In some embodiments, the V2X communication may be a mode-1 sidelink communication, wherein the V2X communication with the other UE 102 is at least partly managed by the eNB 104. In some embodiments, the V2X communication may be an LTE PC5 mode-3 sidelink communication, wherein the V2X communication with the other UE 102 is at least partly managed by the gNB 105.

In some embodiments, the UE 102 may receive, from the eNB 104 over the LTE Uu interface, downlink control information (DCI) or RRC signaling that includes a grant for the NR V2X communication with the other UE 102 using NR PC5 air-interface. In some embodiments, the UE 102 may receive, from the gNB 105 over the NR Uu interface, DCI or RRC signaling that includes a grant for LTE V2X communication with the other UE 102. In some embodiments, the UE 102 may receive, from the gNB 105 over the NR Uu interface, DCI or RRC signaling that includes a grant for the NR V2X communication with the other UE 102. In some embodiments, the UE 102 may receive, from the eNB 104 over the LTE Uu interface, RRC signaling and system information blocks with the configuration settings for NR PC5 communication including NR V2X sidelink communication. In some embodiments, the UE 102 may receive, from the gNB 105 over the NR Uu interface, RRC signaling and system information blocks with the configuration settings for LTE PC5 communication including LTE V2X sidelink communication.

In some embodiments, the DCI may be based on one or more LTE DCI formats, including: DCI format 7-0A, DCI format 8, and DCI format 5B. In some embodiments, the DCI may be received in accordance with a short transmission time interval (TTI) that is less than one millisecond.

In some embodiments, the UE 102 may transmit a sidelink synchronization signal (SLSS) that indicates the reference timing and/or the reference frequency to enable NR V2X communication with out-of-coverage UEs 102.

In some embodiments, the UE 102 may detect one or more NR synchronization signals from a gNB 105 over an NR Uu interface between the UE 102 and the gNB 105. The NR synchronization signals may be detected in resources allocated for NR communication, wherein the NR synchronization signals are detected in accordance with an NR protocol. The UE 102 may determine, based on the NR synchronization signals, a reference timing and a reference frequency for NR V2X communication over the NR PC5 interface with another UE 102 and/or LTE V2X communication over the LTE PC5 interface with another UE 102.

In some embodiments, the UE 102 may detect the NR synchronization signals to determine the reference timing and the reference frequency for the NR V2X communication and/or LTE V2X communication based on the NR synchronization signals if: the UE 102 is configured for communication with the gNB 105 over the NR Uu interface and the UE 102 is configured for communication with another UE 102 over an NR PC5 interface; or the UE 102 is configured for communication with the gNB 105 over the NR Uu interface and the UE 102 is configured for communication with another UE 102 over an LTE PC5 interface.

At operation 505, the eNB 104 and/or gNB 105 may transmit one or more synchronization signals. At operation 510, the eNB 104 and/or gNB 105 may receive measurement reports and/or other signaling. At operation 515, the eNB 104 and/or gNB 105 may configure and/or schedule one or more V2X transmissions and/or sidelink transmissions. At operation 520, the eNB 104 and/or gNB 105 may transmit one or more DCI and/or control signaling to trigger sidelink transmissions.

In some embodiments, the gNB 105 may transmit, to a UE 102 over an NR Uu interface, one or more NR synchronization signals to synchronize the UE 102 for V2X transmissions to another UE 102 over an NR PC5 interface or an LTE PC5 interface. The gNB 105 may receive, from the UE 102, a measurement report that includes one or more of: location information of the UE 102; and other information. The gNB 105 may determine, based on the location information of the UE 102, time resources and frequency resources for V2X transmissions by the UE 102 on the NR PC5 interface or the LTE PC5 interface. The gNB 105 may transmit, to the UE 102 over the NR Uu interface, DCI that includes a grant that schedules the V2X transmissions by the UE 102 on the NR PC5 interface or the LTE PC5 interface.

In some embodiments, the grant schedules the V2X transmissions dynamically or in accordance with semi-persistent scheduling (SPS) configurations. In some embodiments, the DCI may be based on one or more NR DCI formats, including DCI format 3_0, DCI format 3_1, DCI format 3_2, or another DCI format.

In some embodiments, the gNB 105 may receive multiple measurement reports that include location information of multiple UEs 102 configured for V2X transmissions to other UEs 102 over NR PC5 interfaces. The gNB 105 may schedule a plurality of V2X transmissions by two or more of the UEs 102 based on the location information in the multiple measurement reports. The gNB 105 may transmit one or more DCI. Each DCI may include a grant to schedule at least one V2X transmission.

In some embodiments, the gNB 105 may schedule multiple V2X transmissions by two or more UEs 102. Each V2X transmission may be on an NR PC5 interface. The gNB 105 may transmit, in accordance with a broadcast transmission, a group DCI configurable to include scheduling information for the multiple V2X transmissions.

In some embodiments, the gNB 105 may transmit system information block or other RRC signaling to configure parameters of NR V2X sidelink communication. In some embodiments, the gNB 105 may transmit content of an LTE system information block (SIB-21) or other RRC signaling to configure parameters of LTE V2X sidelink communication.

In some embodiments, the measurement report may further include one or more of: a channel busy ratio (CBR); information related to occupied or available candidate NR V2X resources; and other information.

In some embodiments, an eNB 104 may transmit one or more LTE synchronization signals. In some embodiments, the eNB 104 may transmit the one or more LTE synchronization signals to be used for LTE PC5 or NR PC5 synchronization, although the scope of embodiments is not limited in this respect. The eNB 104 may transmit, to a first UE 102 configured for LTE V2X communication, first DCI to schedule an LTE V2X transmission by the first UE 102 in accordance with a first reference timing based on the one or more LTE synchronization signals. In some embodiments, the eNB 104 may transmit one or more NR synchronization signals. The eNB 104 may transmit, to a second UE 102 configured for NR V2X communication, second DCI to schedule an NR V2X transmission by the second UE 102 in accordance with a second reference timing based on the one or more NR synchronization signals.

In some embodiments, the eNB 104 may provide LTE synchronization signals to UEs 102 that support: an LTE Uu interface, and an LTE PC5 interface; or an LTE Uu interface, but not an LTE PC5 interface. The eNB 104 may provide NR synchronization signals to UEs 102 that do not support an LTE Uu interface. In some embodiments, the eNB 104 may transmit system information block or other RRC signaling to configure parameters of LTE V2X sidelink communication.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a User Equipment (UE), the apparatus comprising:
   a processor, configured to:
      detect one or more Long Term Evolution (LTE) synchronization signals from an Evolved Node-B (eNB) over an LTE Uu interface between the UE and the eNB, wherein the LTE synchronization signals are detected in resources allocated for LTE communication, wherein the LTE synchronization signals are detected in accordance with an LTE protocol;
      determine, based on the LTE synchronization signals, a reference timing and/or a reference frequency for New Radio (NR) sidelink communication over an NR PC5 interface with another UE; and
      encode a physical sidelink control channel (PSCCH) and a physical sidelink shared channel (PSSCH) in accordance with an NR protocol, the PSCCH and the PSSCH encoded for transmission to the other UE over the NR PC5 interface in resources allocated for NR sidelink communication.

2. The apparatus according to claim 1, wherein the LTE synchronization signals include one or more of: a primary synchronization signal (PSS), a secondary synchronization signal (SSS), and a physical broadcast channel (PBCH).

3. The apparatus according to claim 1, wherein the LTE synchronization signals include a cell-specific reference signal (CRS).

4. The apparatus according to claim 1,
   wherein the processor is configured to detect the LTE synchronization signals and to determine the reference timing and the reference frequency based on the LTE synchronization signals if:
   the UE is configured for communication with the eNB over the LTE Uu interface and the UE is configured for communication with another UE over an LTE PC5 interface, or
   the UE is configured for communication with the eNB over the LTE Uu interface and the UE is configured for communication with another UE over an NR PC5 interface.

5. The apparatus according to claim 4, the processing circuitry processor further configured to:
   if the UE is not configured for LTE communication over an LTE Uu interface, and the UE is configured for NR communication over an NR Uu interface:
      detect one or more NR synchronization signals; and
      determine, based on the NR synchronization signals, the reference timing and the reference frequency for the NR sidelink communication over the NR PC5 interface or LTE PC5 interface with the other UE, wherein the NR synchronization signals are received from a Next Generation Node-B (gNB) or the NR synchronization signals are received from a dual-mode eNB that supports transmission of both LTE synchronization signals and NR synchronization signals.

6. The apparatus according to claim 1, wherein the NR sidelink communication is a NR PC5 mode-1 sidelink communication, wherein the NR sidelink communication with the other UE is at least partly managed by the eNB, or the NR sidelink communication is an LTE PC5 mode-3 sidelink communication, wherein the NR sidelink communication with the other UE is at least partly managed by a Next Generation Node-B (gNB).

7. The apparatus according to claim 1, the processor further configured to:
  decode, from the eNB over the LTE Uu interface, downlink control information (DCI) or RRC signaling that includes a grant for the NR sidelink communication with the other UE;
  decode, from a Next Generation Node-B (gNB) over an NR Uu interface, DCI or RRC signaling that includes a grant for LTE V2X communication with the other UE; or
  decode, from the gNB over the NR Uu interface, DCI or RRC signaling that includes a grant for the NR sidelink communication with the other UE.

8. The apparatus according to claim 7, wherein the DCI is based on one or more LTE DCI Formats, including DCI format 7-0 A, DCI format 8, and DCI format 5B, and
wherein the DCI is received in accordance with a short transmission time interval (TTI) that is less than one millisecond.

9. The apparatus according to claim 1, the processor further configured to:
  encode, for transmission, a sidelink synchronization signal (SLSS) that indicates the reference timing and/or the reference frequency to enable NR sidelink communication with out-of-coverage UEs.

10. The apparatus according to claim 1, the processor further configured to:
  detect one or more NR synchronization signals from a Next Generation Node-B (gNB) over an NR Uu interface between the UE and the gNB, wherein the NR synchronization signals are detected in resources allocated for NR communication, wherein the NR synchronization signals are detected in accordance with an NR protocol; and
  determine, based on the NR synchronization signals, a reference timing and a reference frequency for NR sidelink communication over the NR PC5 interface with another UE and/or LTE V2X communication over the LTE PC5 interface with another UE.

11. The apparatus according to claim 10, wherein the processor is configured to detect the NR synchronization signals and to determine the reference timing and the reference frequency for the NR sidelink communication and/or LTE V2X communication based on the NR synchronization signals if:
  the UE is configured for communication with the gNB over the NR Uu interface and the UE is configured for communication with another UE over an NR PC5 interface, or the UE is configured for communication with the gNB over the NR Uu interface and the UE is configured for communication with another UE over an LTE PC5 interface.

12. The apparatus of claim 1, wherein:
  the processor includes a baseband processor to determine the reference timing and the reference frequency,
  the apparatus further comprises a transceiver to transmit the PSCCH and the PSSCH.

13. An apparatus, comprising:
  a processor configured to cause a Next Generation Node-B (gNB) to:
  encode, for transmission to a User Equipment (UE) over a New Radio (NR) Uu interface, one or more NR synchronization signals to synchronize the UE for V2X transmissions to another UE over a Long Term Evolution (LTE) PC5 interface;
  decode, from the UE, a measurement report that includes location information of the UE;
  determine, based on the location information of the UE, time resources and frequency resources for V2X transmissions by the UE on the LTE PC5 interface; and
  encode, for transmission to the UE over the NR Uu interface, downlink control information (DCI) that includes a grant that schedules the V2X transmissions by the UE on the NR PC5 interface or the LTE PC5 interface.

14. The apparatus according to claim 13, wherein the grant schedules the V2X transmissions dynamically or in accordance with semi-persistent scheduling (SPS) configurations.

15. The apparatus according to claim 13, wherein the DCI is based on one or more NR DCI formats, including DCI format 3 0, DCI format 3 1, and DCI format 3 2.

16. The apparatus according to claim 13, the processor further configured cause the gNB to:
  decode multiple measurement reports that include location information of multiple UEs configured for V2X transmissions to other UEs over NR PC5 interfaces;
  schedule a plurality of V2X transmissions by two or more of the UEs based on the location information in the multiple measurement reports; and
  encode one or more DCI for transmission, each DCI including a grant to schedule at least one V2X transmission.

17. The apparatus according to claim 13, the processor further configured cause the gNB to:
  schedule multiple V2X transmissions by two or more UEs, each V2X transmission on an NR PC5 interface; and
  encode, for broadcast transmission, a group DCI configurable to include scheduling information for the multiple V2X transmissions.

18. The apparatus according to claim 13, wherein the measurement report further includes one or more of a channel busy ratio (CBR), or information related to occupied or available candidate V2X resources.

19. The apparatus according to claim 13, the processor further configured cause the gNB to:
  encode, for transmission, system information block or other RRC signaling to configure parameters of V2X communication; and
  encode, for transmission, content of an LTE system information block (SIB-21) or other RRC signaling to configure parameters of LTE V2X sidelink communication.

20. An apparatus of an Evolved Node-B (eNB), the apparatus comprising:
a processor, configured to:
encode, for transmission, one or more Long Term Evolution (LTE) synchronization signals; and
encode, for transmission to a first ETser User Equipment (UE) configured for New Radio (NR) sidelink communication, first downlink control information (DCI) to schedule an NR sidelink transmission by the first UE in accordance with a first reference timing based on the one or more LTE synchronization signals.

* * * * *